United States Patent
Schmidt et al.

(10) Patent No.: US 8,190,091 B2
(45) Date of Patent: May 29, 2012

(54) METHOD FOR SETTING DATA TRANSMISSION PARAMETERS AND COMMUNICATION DEVICE

(75) Inventors: Andreas Schmidt, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1163 days.

(21) Appl. No.: 11/945,417

(22) Filed: Nov. 27, 2007

(65) Prior Publication Data

US 2009/0137235 A1    May 28, 2009

(51) Int. Cl.
*H04B 1/00* (2006.01)
*H04B 7/00* (2006.01)
*H04B 15/00* (2006.01)
*H04B 17/00* (2006.01)
*H04M 3/00* (2006.01)

(52) U.S. Cl. ............ 455/63.1; 455/41.2; 455/41.3; 455/63.3; 455/67.11; 455/418

(58) Field of Classification Search ............ 455/41.2, 455/41.3, 63.1, 63.3, 67.11, 69, 418, 552.1, 455/452.1

See application file for complete search history.

(56) References Cited

U.S. PATENT DOCUMENTS 7,440,728 B2 *   10/2008   Abhishek et al. ............ 455/41.2
2008/0219323 A1 *   9/2008   Desai et al. ............... 375/132

OTHER PUBLICATIONS

Wi-Fi and Bluetooth—Interference Issues (www.hp.com/rnd/library/pdf/Wifi_Bluetoothe_coexistence.pdf), Jan. 2002.*

* cited by examiner

*Primary Examiner* — Dwayne Bost
*Assistant Examiner* — Larry Sternbane
(74) *Attorney, Agent, or Firm* — Dickstein Shapiro LLP

(57) ABSTRACT

A method for setting data transmission parameters of a first communication connection comprising determining information about data transmission parameters of at least one established second communication connection and setting the data transmission parameters of the first communication connection taking into account the information about the data transmission parameters of the at least one second communication connection.

21 Claims, 2 Drawing Sheets

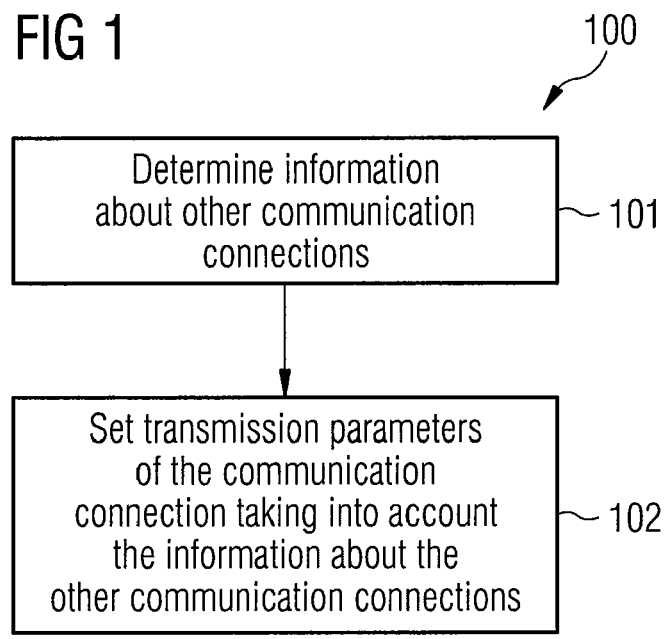
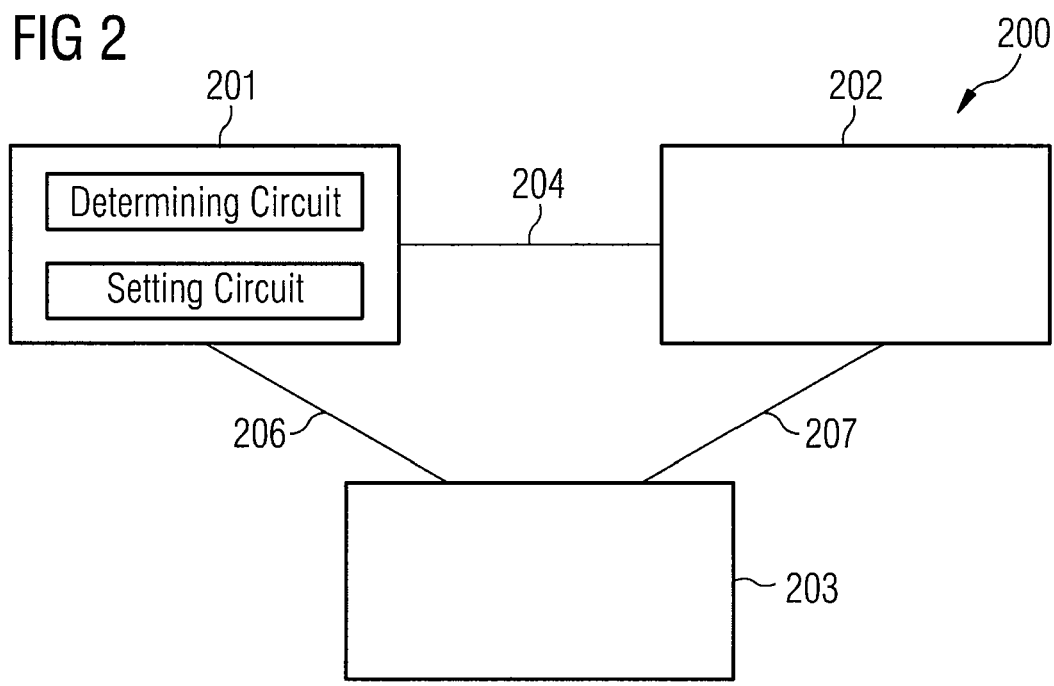

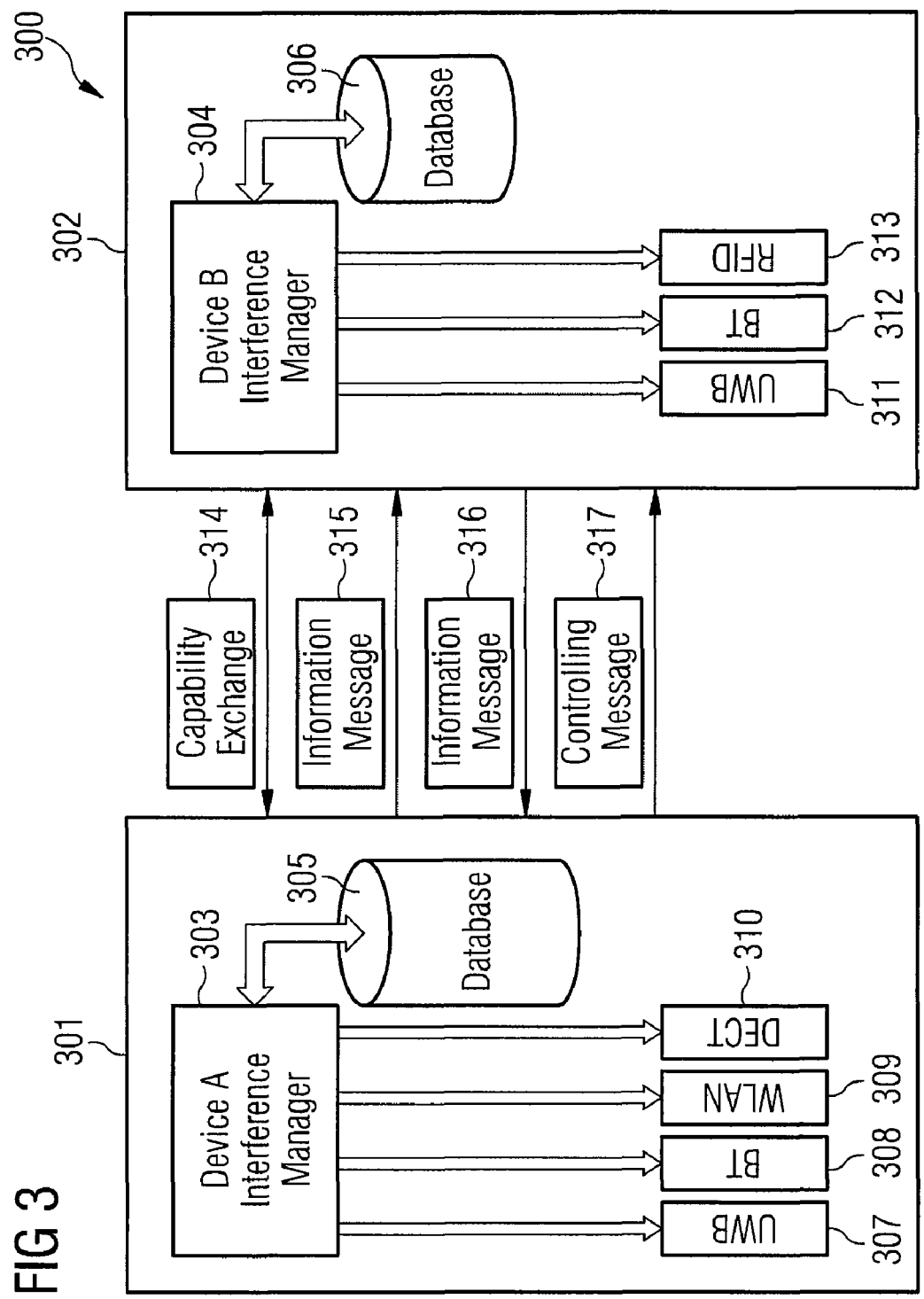

METHOD FOR SETTING DATA TRANSMISSION PARAMETERS AND COMMUNICATION DEVICE

TECHNICAL FIELD

Embodiments of the invention relate generally to a method for setting data transmission parameters and a communication device.

BACKGROUND

In modern wireless communications, a multiplicity of wireless communication technologies are available. When used simultaneously, communications according to different communication technologies may interfere with each other which may lead to transmission errors and low quality of communication connections. Therefore, methods for reducing interferences between communication connections are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a flow diagram according to an embodiment of the invention;

FIG. 2 shows a communication arrangement according to an embodiment of the invention; and FIG. 3 shows a communication arrangement according to an embodiment of the invention.

DESCRIPTION

Modern communication devices often include a plurality of different radio communication interfaces for wireless short-range communications. For example, communication devices may include transceivers for communication according to Bluetooth, WLAN (wireless local area network), ultra wide band (UWB), DECT (digital enhanced cordless telecommunications) or wireless USB (universal serial bus). A communication device may use a plurality of radio communication interfaces simultaneously and it may also be the case that a multiplicity of communication devices are communicating using different radio interfaces and are located in the near vicinity of each other.

The communications using different radio communication interfaces may disturb one another directly or indirectly. Interferences arising from the superposition of a plurality of electric magnetical waves may disturb communications. This may especially happen if the same similar frequency ranges are used for communications according to different radio interfaces. In addition, an electromagnetic wave of a certain frequency and an electromagnetic wave of a multiple of this frequency may interfere which may lead to disturbances of the communications for which the electromagnetic waves are used. Disturbances due to interferences of communications for example lead to an increased error rate of the data transmission during communications.

In the physical layer of most radio communication systems not only single frequencies are used. Instead, for example, frequency spreading methods are used for achieving a high robustness against disturbances. For example, according to Bluetooth, frequency hopping spread spectrum (FHSS) is used. The master of a Bluetooth piconet (i.e. a Bluetooth communication network of communication devices supporting Bluetooth) sets a hopping sequence, according to which the frequency used for communication is periodically changed. When the error rate of a Bluetooth communication connection in the piconet exceeds a threshold the master changes the hopping sequence.

There is the possibility to use a hopping sequence according to which certain frequencies are omitted in the frequency hopping. For example, frequencies may be omitted, the usage of which would lead to disturbances when simultaneously, for example by one of the Bluetooth communication devices or by another communication devices in the vicinity, communications according to WLAN would be carried out. This method of omitting certain frequencies is denoted as detect and avoid (DAA). Such prophylactic methods may lead to the fact that in favour of safety from disturbances, the maximum possible band width is not used.

As an alternative, a communication device may measure interferences. However, such methods may be very complex and the performing of measurements takes time and typically reduces the achievable data rate. Such measurements are comparable with an evaluation of radar data and require CPU power which cannot be neglected. This has for example negative impact on the power consumption and the cooling of the CPU of the communication device.

Therefore, prophylactical methods and methods which are based on interference measurements are not satisfactory in view of the increasing requirements due to new transmission methods, higher band width and an increased usage of short range communications.

In the following, embodiments of the invention are described which may be used as alternatives to the methods described above for reducing interference in short range communications.

FIG. 1 shows a flow diagram 100 according to an embodiment of the invention.

The flow illustrates a method for setting data transmission parameters of a communication connection.

In 101, information about data transmission parameters of at least one established other communication connection is determined.

In 102, the data transmission parameters of the communication connection are set taking into account the information about the data transmission parameters of the at least one other communication connection. The information about the established at least one second communication connection are for example data transmission parameters of the second communication connection. The data transmission parameters include for example at least one of a type of communication technology, a frequency hopping sequence, a frequency range and a transmission power level. In one embodiment, the first communication connection is a short-range communication connection. Similarly, the second communication connection may be a short-range communication connection.

The first communication connection and the second communication connection are for example wireless communication connections.

The method illustrated in FIG. 1, may further include determining, for each data transmission parameter setting from a set of data transmission parameter settings the interference that is expected between the first communication connection and the second communication connection when the data transmission parameters of the first communication connection are set according to the data transmission parameter setting, and selecting, based on the expected interferences, the data transmission parameters for the first communication connection.

The expected interferences are for example determined based on pre-stored information about expected interfences which has for example been generated by simulations or measurements.

The data transmission parameter setting is for example selected such that the expected interference is minimized. The selection of the data transmission parameter setting to minimize the expected interference may be carried out taking into account at least one constraint with regard to the transmission characteristics of the first communication connection. The at least one other constraint is for example a constraint with regard to the data rate of the first communication connection, e.g. a minimum data rate that should be provided by the first communication connection.

In one embodiment, the method illustrated in FIG. 1 may further include selecting a data transmission parameter setting for the second communication connection taking into account the setting of the data transmission parameters of the first communication connection.

The method may further include signalling the data transmission parameters selected for the second communication connection to a communication device participating in the second communication connection.

The first communication connection is for example a communication connection according to one of the communication technologies Bluetooth, WLAN, DECT, RFID, IrDA or wireless USB.

The information about the data transmission parameters of the at least one established second communication connection are for example received from a communication device participating in the second communication connection.

An example for a communication arrangement in which the method illustrated in FIG. 1 may be used is shown in FIG. 2.

FIG. 2 shows a communication arrangement 200 according to an embodiment of the invention.

The communication arrangement 200 includes a first communication device 201, a second communication device 202, and a third communication device 203.

The communication devices 201, 202, 203 are for example mobile communication devices such as a laptop which is equipped with a suitable transceiver, a cell phone, a PDA (personal digital assistant), or also stationary communication devices such as an access point (e.g. of a WLAN) or a desktop computer which is equipped with a transceiver for wireless communication.

The communication devices 201, 202, 203 may communicate using short range radio communications, for example according to Bluetooth (according to legacy Bluetooth or using the UWB), IrDA, RFID, WLAN, DECT, or wireless USB.

For example, the first communication device 201 carries out the method illustrated in FIG. 1 for setting data transmission parameters of a first communication connection 204 between the first communication device 201 and a second communication device 202.

For example, the first communication device 201 includes a determining circuit configured to determine information about data transmission parameters of at least one established other communication connection, for example a second communication connection 206 between the first communication device 201 and the third communication device 203 or a third communication connection 207 between the second communication device 202 and the third communication device 203.

The first communication device 201 for example may further include a setting circuit 208 which is configured to set data transmission parameters of the first communication connection 204 taking into account the information about the data transmission parameters of the at least one other communication connection 206, 207.

The first communication device 201 may further include a selecting circuit configured to select a data transmission parameter setting for the other communication connection 206, 207 taking into account the setting of the data transmission parameters of the first communication connection.

In one embodiment, the first communication device 201 may further include a signalling circuit configured to signal the data transmission parameters selected for the other communication connection 206, 207 to a communication device participating in the other communication connection 206, 207, e.g. the second communication device 202 or the third communication device 203.

The other communication connection may be a communication connection in which the first communication device 201 does not participate itself such as, in this example, the third communication connection 207.

For participating in the first communication connection 204, the first communication device 201 for example includes a transceiver according to one of the communication technologies Bluetooth, WLAN, DECT, RFID, IrDA or wireless USB.

The first communication device 201 may for example include a receiver for receiving the information about the data transmission parameters of the at least one established second communication connection from a communication device participating in the other communication connection, in this example the second communication device 202 or the third communication device 203.

A circuit can be a hardware circuit, e.g. an integrated circuit, designed for the respective functionality or also a programmable unit, such as a processor, programmed for the respective functionality. A processor may for example be a RISC (reduced instruction set computer) processor or a CISC (complex instruction set computer).

The determining circuit 205 and the setting circuit 208 are for example implemented in form of a functional unit which is denoted as interference manager. The functionality of the interference manager according to one embodiment of the invention is described in more detail in the following with reference to FIG. 3.

FIG. 3 shows a communication arrangement 300 according to an embodiment of the invention.

The communication arrangement 300 may include a first communication device which for example corresponds to the first communication device 201 in FIG. 2 and a second communication device 302 which for example corresponds to the second communication device 202 in FIG. 2.

The first communication device 301 and the second communication device 302 each include an interference manager 303, 304 which is coupled with a data base 305, 306 of the respective communication device 301, 302. The data bases 305, 306 are for example implemented using a flash memory or another memory of the respective communication device 301, 302 and may include information about the interaction of different short range communication technologies, for example about interference to be expected between Bluetooth communication and WLAN communication. This information is for example generated by the manufacturer of the communication devices 301, 302 by simulations under laboratory conditions. The information is for example stored in the data bases 305, 306 in the form of a matrix such that each row of the matrix corresponds to a certain short range radio communication technology with a certain setting of transmission parameters (such as channel number, frequency hopping sequence, power level) and each column of the matrix corresponds to a certain short range radio communication technology with a certain setting of transmission parameters and an entry in the matrix gives information about interference between the short range communication technology with the transmission parameters corresponding to the row in which the entry is located and the short range communication technology with transmission parameters which corresponds to the column in which the entry is located.

An entry gives for example information about the strength of the interference between the two short range communication technologies with the respective transmission parameters or also information about the reduction of data rate which occurs when the interference between the two short range communication technologies (with the respective transmission parameters) is avoided. An entry (a field of the matrix) where these two values are low (e.g. the sum of these two values is low) defines two short range communication technologies and their setting of transmission parameters with which low interference and high data rate can be achieved.

For example, a short-range communication technologie and its transmission parameter setting for one communication connection and a short-range communication technologie and its transmission parameter setting for another communication connection may be selected based on the field of the table of which the (possibly weighted) sum of these two values is minimal, to achieve high data rate of the two communication connections and low interference of the two communication connections.

The communication devices 301, 302 for example inform each other that they have an interference manager using a capability exchange 314 which is for example carried out when the first communication connection 204 between the communication devices 301, 302 is established. When a plurality of communication devices 301, 302 are connected by one or more communication connections, such as it is the case in this example, one of the interference managers 303, 304 is selected for the role of controlling the interference minimization, i.e. for setting the transmission parameters (which may include the type of radio technology, e.g. WLAN or Bluetooth) for the communication connections 204, 206, 207. In the selection, the class of the communication devices (for example a laptop having a higher computation power is preferred over a cell phone with lower computation power) and user settings can be taken into account. Preferences of the users of the communication devices 301, 302 can for example simply be introduced by providing the possibility of activation and deactivation of the interference managers 303, 304 by the respective users.

For establishing and using the communication connections 204, 206, 207, the communication devices 301, 302 each include a plurality of radio communication modules 307-313 (transceivers) which act as radio communication interfaces. In this example, the first communication device 301 includes an UWB interface 307 for communicating using the ultra wide band (e.g. according to Bluetooth), a Legacy Bluetooth interface 308 for communication according to Legacy Bluetooth, a WLAN interface 309 for communicating according to WLAN and a DECT interface 310 for DECT communication. The second communication device 302 includes an UWB interface 311, a Legacy Bluetooth interface 312 and an RFID (radio frequency identification) interface 313 for RFID communications, for example for reading out RFID tags.

When a radio interface 307-310 of the first communication device 301 is activated (i.e. it is started to be used for communication, for example a communication connection is established) or deactivated (i.e. the use of the communication interface is stopped, for example a communication connection is released) the interference manager 303 of the first communication device 301 may inform the interference manager 304 of the second communication device 302 of the activation or deactivation of the radio interface 307-310 by sending a first information message 315. The information message 315 may also include information about the intended use of an activated communication interface 307-310, for example whether the communication interface is to be used for Voice-over-IP, gaming applications or streaming applications. This information can for example be taken into account by an interference manager 303, 304 when minimizing interference by a corresponding setting of transmission parameters by deciding, depending on the intended use of the respective communication interface 307-310, for example using information from the data bases 305, 306, whether the latency of the communication via the communication interface 307-310 should be minimized (e.g. when the intended use is a gaming communication service) or the data rate should be maximized (e.g. when the intended use is a streaming communication service).

For setting transmission parameters the distance of the communication devices 301, 302 may also be taken into account, provided the communication devices 301, 302 have information about their distance.

Similarly to the first information message 315, the second communication device 302 may transmit a second information message 316 to the first communication device 301 including information about the activation or the deactivation and (optionally) the intended usage of the radio communication interfaces 311-313 of the second communication device 302.

As mentioned above, one of the interference managers 303, 304 may be selected as having the role of interference minimization. For example, the interference manager 303 of the first communication device 301 is selected for controlling the interference minimization. In this case, for example, the first information message 315 is not sent, but the first communication device only receives information from communication devices to which it is connected, for example the second communication device 202, 302 or the third communication device 203 about the status (activation, deactivation, intended use) of the communication interfaces of the other communication devices 202, 203 as it is done by the second information message 316. Since the usage of a communication interface is always accompanied through the usage of a corresponding communication connection, this information may be seen as information about communication connections in which the communication devices 201, 202, 203 participate (e.g. the information that a communication connection is established or is released, information about the transmission parameters and the communication technology used for the communication connection, intended or actual use of the communication connection etc.).

The interference manager 303 controlling the interference minimization collects the information from the other communication devices 202, 203, evaluates the information using the information of the data base 305 and determines a setting of transmission parameters for communication connections in which the first communication device 301 participates (or, in the case that a communication connection is to be established, is going to participate). Such transmission parameters for example include a channel number (e.g. corresponding to a frequency range used for the communication connection), a frequency hopping sequence or a transmission power level.

The setting of a transmission parameter for a communication connection may also include the selection of a communication interface which is used for the communication connection. For example, the interference manager 303 may decide that the usage of Bluetooth for a communication connection would lead to high interference and therefore WLAN should be used for the communication connection.

The interference manager 303 may determine the setting of transmission parameters such that the interference is minimized or at least kept at an acceptable low level, e.g. kept under a pre-determined threshold. There may be a trade-off between minimizing interference and other factors, for example the achievable data rate. In this case, the interference manager 303 may weigh up the various factors when determining a transmission parameter setting.

When the interference manager 303 has been selected as controlling interference manager it may also determine transmission parameter settings for communication connections in which the first communication device 301 does not itself participate but one of the other communication devices 202, 203 participates, for example for the third communication connection 207. For example, the first communication device 301 sends a controlling message 317 to the second communication device 302 with which the usage of the transmission parameter setting that was determined by the interference manager 303 for the third communication connection 207 is suggested.

To allow the interference manager 303 to give suggestions about radio communication technologies that are not supported by the first communication device 301 itself (in this case for example RFID) the data bus 305 may hold information about radio communication interfaces and radio communication technologies that are not supported by the first communication device 301.

An exemplary application scenario is described in the following with reference to FIG. 2.

It is assumed that the first communication device 201 is a laptop, includes an interference manager, and has a communication interface for communication according to IrDA (infrared data association), a WLAN communication interface, a Bluetooth communication module of which the physical layer supports communication according to legacy Bluetooth and communication using UWB, and a DECT communication interface.

The second communication device 202 is assumed to be a handheld computing device with no interference manager and an IrDA communication interface, a WLAN communication interface and a Bluetooth communication module supporting communication according to legacy Bluetooth.

The third communication device 203 is assumed to be a cell phone including an interference manager and having an IrDA communication interface and Bluetooth communication module supporting communication according to legacy Bluetooth and using UWB.

In this example, the first communication connection 204 between the first communication device 201 and the second communication device 202 is a WLAN communication connection which is used for transmitting a large data file from the first communication device 201 to the second communication device 202. In this example, WLAN is the communication technology allowing the highest data rate among the communication technologies supported by both the first communication device and the second communication device 202. It may therefore be desirable to use WLAN for the transmission of the large data file.

Additionally, in this application example, the second communication connection 206 between the first communication device 201 and the third communication device 203 is assumed to be a Bluetooth communication connection using UWB which is for example used for transmitting music data files from the first communication device 201 to the third communication device 203. Bluetooth using UWB is the communication technology allowing the highest data rate among the communication technologies supported by both the first communication device 201 and the third communication device 203. This may therefore be selected for the transmission of the music data files.

The third communication connection between the second communication device 202 and the third communication device 203 is assumed to be a Bluetooth communication connection according to legacy Bluetooth for synchronizing addresses and appointments between the second communication device and the third communication device. According to Bluetooth, special Bluetooth profiles are defined for this task. Therefore, Bluetooth may be suitable for the third communication connection 207.

It is further assumed that the user of the first communication device 201 is the same as the user of the third communication device 203 and the interference manager of the first communication device 201 was assigned a lower priority than the interference manager of the third communication device 203 by the user. Consequently, in this example, the interference manager of the third communication device 203 is selected as an active interference manager, i.e. as the interference manager controlling the interference minimization in the communication network formed by the communication devices 201, 202, 203 and the interference manager of the first communication device 201 is selected as passive interference manager which does not control the setting of the transmission parameters for the communication connections 204, 206, 207 but provides information to the interference manager of the third communication device 203 about communication connections established in the communication network.

In view of the way the communication connections 204, 206, 207 are used the communication technologies and settings of transmission parameters of the communication connections 204, 206, 207 are suitably selected but in the overall system formed by the communication devices 201, 202, 203 and the communication connections 204, 206, 207 the selection of transmission parameters (including the selected communication technologies) may not be optimal with regard to the interference. When the transmission parameters for each communication connection 204, 206, 207 are selected without taking into account information about the other communication connections 204, 206, 207 low interference is only achieved by coincidence. With high probability there is high interference between the communication connections 204, 206, 207 in this example.

The active interference manager may collect information about the established communication connections 204, 206, 207 with the help of the passive interference manager. Using the data stored in the data base to which the active interference manager is coupled as explained with reference to FIG. 3, the active interference manager determines transmission parameters which lead to optimal or at least reduced interference between the communication connections 204, 206, 207 and sets the transmission parameters for the communication connection in which the third communication device 203 participates, i.e. the second communication connection 206 and the third communication connection 207 accordingly and signals the transmission parameters to be used for the first communication connection 204 to the passive interference manager of the first communication device 201 and the first communication device 201 sets the transmission parameters of the first communication connection 204 accordingly.

In this way, in short range communications, transmission parameters for communication connections are not optimized individually for the communication connections but the overall system is taken into account in the determination of the transmission parameters of the communication connections. In the determination results from measurements which have previously been carried out, and which are for example stored in the data bases 305, 306, can be taken into account. In this way, it is not necessary to carry out an interference measurement of the currently established communication connections or carrying out measurements to determine the impact of a change of transmission parameters for currently established communication connections. As it is the case for the first communication connection 204, the passive interference manager may provide information about a communication connection in which the communication device including the active interference manager does not participate. The change of transmission parameters for a communication connection for reducing interference may also include releasing the communication connection and replacing it by another communication connection, for example the communication connection using a different communication technology.

The automatic setting of transmission parameters and communication technologies for communication connections follows the current trend of an automatic selection of radio communication technologies to be used by communication devices. While currently, users often select the communication technology to be used for a communication connection at themselves, there is the development in the direction that communication devices exchange information about their capabilities and select a communication technology to be used for a communication connection depending on their capabilities and the intended use of the communication connection.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for setting data transmission parameters of a first communication connection comprising:
    determining, by a determining circuit, from a received information message, information about data transmission parameters of at least one established second communication connection;
    determining, by the determining circuit, using the information about the data transmission parameters of the at least one established second communication connection, for each data transmission parameter setting from a set of data transmission parameter settings, interference that is expected between the first communication connection and the second communication connection when the data transmission parameters of the first communication connection are set according to the data transmission parameter setting, wherein the expected interferences are determined based on pre-stored information about expected interferences, and wherein the pre-stored information is generated by simulations or measurements during manufacture of a communication device;
    selecting, based on the expected interferences, the data transmission parameters for the first communication connection; and
    setting, by a setting circuit, the data transmission parameters of the first communication connection taking into account the information about the data transmission parameters of the at least one second communication connection.

2. The method according to claim 1, wherein the data transmission parameters include at least one of a type of communication technology, a frequency hopping sequence, a frequency range and a transmission power level.

3. The method according to claim 1, wherein the first communication connection is a short-range communication connection.

4. The method according to claim 1, wherein the second communication connection is a short-range communication connection.

5. The method according to claim 1, wherein the first communication connection and the second communication connection are wireless communication connections.

6. The method according to claim 1, wherein the data transmission parameter setting is selected such that the expected interference is minimized.

7. The method ac cording to claim 6, wherein the selection of the data transmission parameter setting to minimize the expected interference takes into account at least one constraint with regard to the transmission characteristics of the first communication connection.

8. The method ac cording to claim 7, wherein the at least one constraint is a constraint with regard to the data rate of the first communication connection.

9. The method ac cording to claim 1, further comprising:
selecting a data transmission parameter setting for the second communication connection taking into account the setting of the data transmission parameters of the first communication connection.

10. The method ac cording to claim 9, further comprising:
signaling the data transmission parameters selected for the second communication connection to a communication device participating in the second communication connection.

11. The method ac cording to claim 1, wherein the first communication connection is a communication connection according to a communication technology selected from the group of communication technologies consisting of Bluetooth, WLAN, DECT, RFID, IrDA and wireless USB.

12. The method ac cording to claim 1, wherein the information about the data transmission parameters of the at least one established second communication connection are received from a communication device participating in the second communication connection.

13. A communication device, comprising:
a determining circuit configured to determine, from a received information message, information about data transmission parameters of at least one established second communication connection;

the determining circuit further configured to determine, using the information about the data transmission parameters of the at least one established second communication connection, for each data transmission parameter setting from a set of data transmission parameter settings, interference that is expected between the first communication connection and the second communication connection when the data transmission parameters of the first communication connection are set according to the data transmission parameter setting, wherein the expected interferences are determined based on pre-stored information about expected interferences and wherein the pre-stored information is generated by simulations or measurements during manufacture of the communication device;

a selecting circuit configured to select, based on the expected interferences, the data transmission parameters for the first communication connection; and a setting circuit configured to set data transmission parameters of a first communication connection taking into account the information about the data transmission parameters of the at least one second communication connection.

14. The communication device according to claim 13, further comprising:
a selecting circuit configured to select a data transmission parameter setting for the second communication connection taking into account the setting of the data transmission parameters of the first communication connection.

15. The communication device according to claim 14, further comprising:
a signaling circuit configured to signal the data transmission parameters selected for the second communication connection to a communication device participating in the second communication connection.

16. The communication device according to claim 13, wherein the communication device does not participate in the second communication connection.

17. The communication device according to claim 13, further comprising:
a transceiver according to a communication technology selected from the group of communication technologies consisting of Bluetooth, WEAN, DECT, RFID, IrDA and wireless USB, for participating in the first communication connection.

18. The communication device according to claim 13, further comprising:
a receiver configured to receive the information about the data transmission parameters of the at least one established second communication connection from a communication device participating in the second communication connection.

19. A communication device, comprising:
determining means for determining, from a received information message, information about data transmission parameters of at least one established second communication connection;
the determining means further for determining, using the information about the data transmission parameters of the at least one established second communication connection, for each data transmission parameter setting from a set of data transmission parameter settings, interference that is expected between the first communication connection and the second communication connection when the data transmission parameters of the first communication connection are set according to the data transmission parameter setting, wherein the expected interferences are determined based on pre-stored information about expected interferences, and wherein the pre-stored information is generated by simulations or measurements during manufacture of the communication device;
selecting means for selecting, based on the expected interferences, the data transmission parameters for the first communication connection; and
setting means for setting data transmission parameters of a first communication connection taking into account the information about the data transmission parameters of the at least one second communication connection.

20. A method for setting data transmission parameters of a first communication connection comprising:
determining, from a received information message, information about the data transmission parameters of at least one established second communication connection;
determining, using the information about the data transmission parameters of the at least one established second communication connection, for each data transmission parameter setting of a first communication connection from a set of data transmission parameter settings interference that is expected between the first communication connection and the at least one established second communication connection when the data transmission parameters of the first communication connection are set according to the data transmission parameter setting, wherein the expected interference is determined based on pre-stored information about the expected interference, and wherein the pre-stored information is generated by simulations or measurements during manufacture of a communication device; and
selecting, based on the expected interferences, the data transmission parameters for the first communication connection.

21. A communication device comprising:
a determining circuit configured to determine, from a received information message, information about the data transmission parameters of at least one established second communication connection;
a determining circuit configured to determine, using the information about the data transmission parameters of the at least one established second communication connection, for each data transmission parameter setting of a first communication connection from a set of data transmission parameter settings interference that is expected between the first communication connection and the at least one established second communication connection when the data transmission parameters of the first communication connection are set according to the data transmission parameter setting, wherein the expected interference is determined based on pre-stored information about the expected interference, and wherein the pre-stored information is generated by simulations or measurements during manufacture of the communication device; and
a selecting circuit configured to select, based on the expected interferences, the data transmission parameters for the first communication connection.

* * * * *